US012175906B1

(12) United States Patent
Chang et al.

(10) Patent No.: US 12,175,906 B1
(45) Date of Patent: Dec. 24, 2024

(54) DISPLAY DEVICE AND DRIVING METHOD THEREOF

(71) Applicant: AUO Corporation, Hsinchu (TW)

(72) Inventors: Che-Chia Chang, Hsinchu (TW); Cheng-Hsing Lin, Hsinchu (TW); Ming-Hsien Lee, Hsinchu (TW); Chia-En Wu, Hsinchu (TW); Shu-Han Chang, Hsinchu (TW); Chun-Shiang Dai, Hsinchu (TW); Ming-Hung Chuang, Hsinchu (TW); Che-Wei Tung, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/467,721

(22) Filed: Sep. 14, 2023

(30) Foreign Application Priority Data

Jun. 9, 2023 (TW) ................................ 112121728

(51) Int. Cl.
*G09G 3/20* (2006.01)

(52) U.S. Cl.
CPC ....... *G09G 3/20* (2013.01); *G09G 2310/0267* (2013.01); *G09G 2310/0286* (2013.01); *G09G 2320/02* (2013.01)

(58) Field of Classification Search
CPC ............ G09G 3/20; G09G 2310/0267; G09G 2310/0286; G09G 2320/02
See application file for complete search history.

(56) References Cited

U.S. PATENT DOCUMENTS

| | | | | |
|---|---|---|---|---|
| 11,636,794 | B2 | 4/2023 | Chang et al. | |
| 2008/0278467 | A1* | 11/2008 | Hwang | G09G 3/3648 345/87 |
| 2018/0211617 | A1* | 7/2018 | Li | G09G 3/3614 |
| 2020/0394953 | A1* | 12/2020 | Kim | G09G 3/32 |
| 2022/0358878 | A1* | 11/2022 | Kim | G09G 3/3225 |

* cited by examiner

*Primary Examiner* — Stephen G Sherman
(74) *Attorney, Agent, or Firm* — JCIPRNET

(57) ABSTRACT

A display device and a driving method thereof are provided. In the display device, a display panel has multiple first pixel rows and multiple second pixel rows arranged alternately. In a first time interval, a first gate driver sequentially drives the first pixel rows using a first driving method. In a second time interval, a second gate driver sequentially drives the second pixel rows using the first driving method. In a third time interval, a third gate driver sequentially drives the first pixel rows using a second driving method. In a fourth time interval, a fourth gate driver sequentially drives the second pixel rows using the second driving method. One of the first driving method and the second driving method is a pulse amplitude modulation driving method, and the other of the first driving method and the second driving method is a pulse width modulation driving method.

10 Claims, 7 Drawing Sheets

DISPLAY DEVICE AND DRIVING METHOD THEREOF

CROSS-REFERENCE TO RELATED APPLICATION

This application claims the priority benefit of Taiwan application serial no. 112121728, filed on Jun. 9, 2023. The entirety of the above-mentioned patent application is hereby incorporated by reference herein and made a part of this specification.

BACKGROUND

Technical Field

The disclosure relates to a driving technology, and in particular, to a display device and a driving method thereof.

Description of Related Art

In a general display device, the pixel circuit usually has a PWM block controlled by pulse width modulation (PWM) and/or a PAM block controlled by pulse amplitude modulation (PAM), and the pixel circuit may be driven through the PWM block and/or the PAM block, whereby the brightness of the light emitted by the light-emitting element may be adjusted.

However, in the conventional driving technology, the display quality may be affected due to the design of the display device being more likely to be affected by insufficient charging rate.

In view of this, it is an important issue for practitioners of the field to find out how to improve the charging efficiency of the pixel circuit so as to improve the display quality of the display screen.

SUMMARY

The disclosure provides a display device and a driving method thereof, which may effectively improve charging efficiency of a pixel circuit so as to improve display quality of a display screen.

A display device of the disclosure includes a display panel, a first gate driver, a second gate driver, a third gate driver, and a fourth gate driver. The display panel has multiple first pixel rows and multiple second pixel rows. The multiple first pixel rows and the multiple second pixel rows are arranged alternately. In a first time interval, the first gate driver sequentially drives the multiple first pixel rows using a first driving method. In a second time interval following the first time interval, the second gate driver sequentially drives the multiple second pixel rows using the first driving method. In a third time interval following the second time interval, the third gate driver sequentially drives the multiple first pixel rows using a second driving method. In a fourth time interval following the third time interval, the fourth gate driver sequentially drives the multiple second pixel rows using the second driving method. One of the first driving method and the second driving method is a pulse amplitude modulation (PAM) driving method, and the other of the first driving method and the second driving method is a pulse-width modulation (PWM) driving method.

A driving method of a display device of the disclosure includes the following steps. A display panel having multiple first pixel rows and multiple second pixel rows is provided. The multiple first pixel rows are arranged alternately with the multiple second pixel rows, respectively. In a first time interval, a first gate driver is provided to sequentially drive the multiple first pixel rows using a first driving method. In a second time interval following the first time interval, a second gate driver is provided to sequentially drive the multiple second pixel rows using the first driving method. In a third time interval following the second time interval, a third gate driver is provided to sequentially drive the multiple first pixel rows using a second driving method. In a fourth time interval following the third time interval, a fourth gate driver is provided to sequentially drive the multiple second pixel rows using the second driving method. One of the first driving method and the second driving method is a pulse amplitude modulation (PAM) driving method, and the other of the first driving method and the second driving method is a pulse-width modulation (PWM) driving method.

Based on the above, the display device and the driving method thereof of the disclosure may sequentially drive the pixels of the first and second pixel rows in the first and second time intervals using the first driving method through the first and second gate drivers. Moreover, in the third and fourth time intervals, the display device may sequentially drive the pixels of the first and second pixel rows through the third and fourth gate drivers using the second driving method. In this way, the display device of the disclosure may effectively increase the charging time of the pixel circuit, whereby the charging efficiency of the pixel circuit may be improved so as to improve the display quality of the display screen.

DESCRIPTION OF THE EMBODIMENTS

Figure 1:
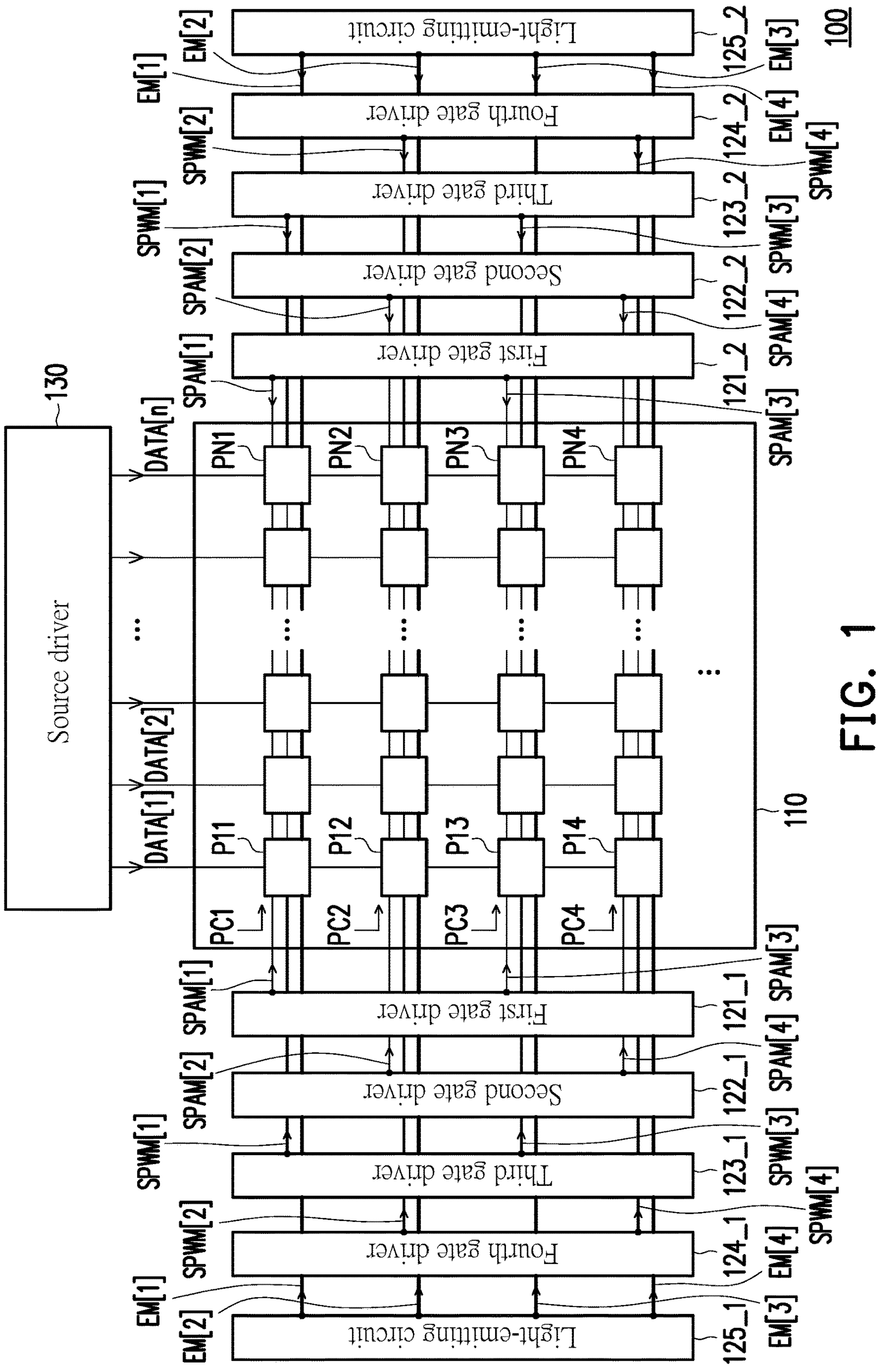
FIG. 1 is a schematic diagram of a display device according to an embodiment of the disclosure.

The term "coupled (or connected)" used throughout the specification of this specification (including the claims) may refer to any direct or indirect means of connection. For example, if a first device is described as being coupled (or connected) to a second device, it should be interpreted that the first device may be directly connected to the second device, or the first device may be indirectly connected to the second device through other devices or some connection means. In addition, wherever possible, elements/components/steps using the same reference numerals in the drawings and embodiments represent the same or similar parts. Elements/components/steps that have the same reference numerals or names in different embodiments may serve as reference for each other.

FIG. 1 is a schematic diagram of a display device according to an embodiment of the disclosure Referring to FIG. 1, a display device 100 includes a display panel 110, first gate drivers 121_1 and 121_2, second gate drivers 122_1 and 122_2, third gate drivers 123_1 and 123_2, fourth gate drivers 124_1 and 124_2, light-emitting circuits 125_1 and 125_2, and a source driver 130.

In the embodiment, the display panel 110 includes multiple pixels (or pixel circuits) P11 to PN1, P12 to PN2, P13 to PN3, and P14 to PN4. The pixels P11 to PN1, P12 to PN2, P13 to PN3, and P14 to PN4 may be configured at the intersections of data lines and gate lines and may control the pixel circuit operation through the corresponding gate lines and data lines.

The pixels P11 to PN1, P12 to PN2, P13 to PN3, and P14 to PN4 may be arranged into multiple pixel rows PC1 to PC4. For example, the pixels P11 to PN1 may be arranged into the pixel row PC1; the pixels P12 to PN2 may be arranged into the pixel row PC2, the pixels P13 to PN3 may be arranged into the pixel row PC3, and the pixels P14 to PN4 may be arranged into the pixel row PC4. The pixel rows PC1 to PC4 may be arranged alternately.

It should be noted that, in the embodiment, the pixel rows PC1 and PC3 may be the pixel rows of the odd-numbered rows (i.e., the first pixel rows) of the display panel 110, and the pixel rows PC2 and PC4 may be the pixel rows of the even-numbered rows (i.e., the second pixel rows) of the display panel 110. In the embodiment of the disclosure, those skilled in the art may determine the number of pixels of the display panel 110 according to the design requirements of the display device 100, and the disclosure is not limited to the above-mentioned number. The aforementioned N is a positive integer.

Figure 2:
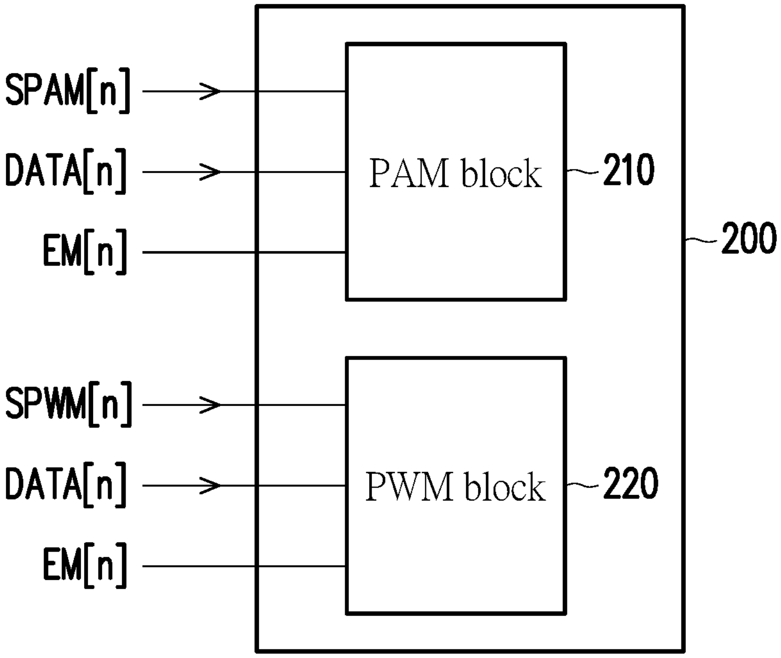
FIG. 2 is a schematic diagram of the pixel circuit according to the embodiment of FIG. 1 of the disclosure.

In particular, for the description of the pixels (or pixel circuits) P11 to PN1, P12 to PN2, P13 to PN3, and P14 to PN4 of the display panel 110, please refer to FIG. 1 and FIG. 2 at the same time. FIG. 2 is a schematic diagram of the pixel circuit according to the embodiment of FIG. 1 of the disclosure. Any one of the pixels (or pixel circuits) P11 to PN1, P12 to PN2, P13 to PN3, and P14 to PN4 of the display panel 110 may be implemented by a pixel circuit 200 shown in FIG. 2.

In the embodiment, the pixel circuit 200 may include a PAM block 210 and a PWM block 220. The PAM block 210 may include related electronic circuits for implementing the PAM control method, and the PWM block 220 may include related electronic circuits for implementing the PWM control method.

Specifically, the pixel circuit 200 may receive PAM control signals SPAM[n] generated by the first gate drivers 121_1 and 121_2 and/or the second gate drivers 122_1 and 122_2 through the PAM block 210 and receive data voltages DATA[n] generated by the source driver 130.

In this way, the first gate drivers 121_1 and 121_2 and/or the second gate drivers 122_1 and 122_2 may activate the operation of the PAM block 210 of the pixel circuit 200 through the enabled PAM control signals SPAM[n] to perform PAM driving on the pixel circuit 200. At the same time, the source driver 130 may correspondingly write the data voltages DATA[n] into the pixel circuit 200.

On the other hand, the pixel circuit 200 may receive PWM control signals SPWM[n] generated by the third gate drivers 123_1 and 123_2 and/or the fourth gate drivers 124_1 and 124_2 through the PWM block 220 and receive the data voltages DATA[n] generated by the source driver 130.

In this way, the third gate drivers 123_1 and 123_2 and/or the fourth gate drivers 124_1 and 124_2 may activate the operation of the PWM block 220 of the pixel circuit 200 through the enabled PWM control signals SPWM[n] to perform PWM driving on the pixel circuit 200. At the same time, the source driver 130 may correspondingly write the data voltages DATA[n] into the pixel circuit 200.

In addition, in the embodiment, the pixel circuit 200 may receive light-emitting control signals EM[n] generated by the light-emitting circuits 125_1 and 125_2. In this way, the pixel circuit 200 may turn on the light-emitting element according to the enabled light-emitting control signals EM[n].

It is worth mentioning that the embodiment does not limit the implementation of the pixel circuit 200. For example, in some embodiments, the pixel circuit 200 may include a pixel circuit with a PAM block (or a related circuit using PAM driving) and a PWM block (or a related circuit using PWM driving) known to those skilled in the art.

Please refer back to the content of FIG. 1. In the embodiment, the first gate driver 121_1, the second gate driver 122_1, the third gate driver 123_1, the fourth gate driver 124_1, and the light-emitting circuit 125_1 may be configured on the first side of the display panel 110 (such as the left side of the display panel 110), and the first gate driver 121_2, the second gate driver 122_2, the third gate driver 123_2, the fourth gate driver 124_2, and the light-emitting circuit 125_2 may be configured on the second side of the display panel 110 relative to the first side (e.g., the right side of the display panel 110), but the disclosure is not limited thereto.

In the embodiment, the first gate drivers 121_1 and 121_2 may be coupled to the multiple pixels of the odd-numbered rows of the display panel 110 (i.e., the multiple pixels P11 to PN1 in the first pixel row PC1 and the multiple pixels P13 to PN3 in first pixel row PC3). The first gate drivers 121_1 and 121_2 may generate the PAM control signals SPAM[1] and SPAM[3] to the corresponding multiple pixels P11 to PN1 in the first pixel row PC1 and the multiple pixels P13 to PN3 in the first pixel row PC3 according to the start pulse signal.

In this case, the first gate drivers 121_1 and 121_2 may drive the corresponding pixels (or pixel circuits) in the first pixel row PC1 and/or the first pixel row PC3 using the PAM driving method through the PAM control signal SPAM[1] and/or the PAM control signal SPAM[3].

On the other hand, the second gate drivers 122_1 and 122_2 may be coupled to the multiple pixels of the even-numbered rows of the display panel 110 (i.e., the multiple pixels P12 to PN2 in the second pixel row PC2 and the multiple pixels P14 to PN4 in the second pixel row PC4). The second gate drivers 122_1 and 122_2 may generate the PAM control signals SPAM[2] and SPAM[4] to the corresponding multiple pixels P12 to PN2 in the second pixel row PC2 and the multiple pixels P14 to PN4 in the second pixel row PC4 according to the start pulse signal.

In this case, the second gate drivers 122_1 and 122_2 may drive the corresponding pixels (or pixel circuits) in the second pixel row PC2 and/or the second pixel row PC4 using the PAM driving method through the PAM control signal SPAM[2] and/or the PAM control signal SPAM[4].

On the other hand, the third gate drivers 123_1 and 123_2 may be coupled to the multiple pixels of the odd-numbered rows of the display panel 110 (i.e., the multiple pixels P11 to PN1 in the first pixel row PC1 and the multiple pixels in P13 to PN3 in the first pixel row PC3). The third gate drivers 123_1 and 123_2 may generate the PWM control signals SPWM[1] and SPWM[3] to the corresponding multiple pixels P11 to PN1 in the first pixel row PC1 and the multiple pixels P13 to PN3 in the first pixel row PC3 according to the start pulse signal.

In this case, the third gate drivers 123_1 and 123_2 may drive the corresponding pixels (or pixel circuits) in the first pixel row PC1 and/or the first pixel row PC3 using the PWM driving method through the PWM control signal SPWM[1] and/or the PWM control signal SPWM[3].

On the other hand, the fourth gate drivers 124_1 and 124_2 may be coupled to the multiple pixels of the even-numbered rows of the display panel 110 (i.e., the multiple pixels P12 to PN2 in the second pixel row PC2 and the multiple pixels P14 to PN4 in the second pixel row PC4). The fourth gate drivers 124_1 and 124_2 may generate the PWM control signals SPWM[2] and SPWM[4] to the corresponding multiple pixels P12 to PN2 in the second pixel row PC2 and the multiple pixels P14 to PN4 in the second pixel row PC4 according to the start pulse signal.

In this case, the fourth gate drivers 124_1 and 124_2 may drive the corresponding pixels (or pixel circuits) in the second pixel row PC2 and/or the second pixel row PC4 using the PWM driving method through the PWM control signal SPWM[2] and/or the PWM control signal SPWM[4].

For the implementation details of the first gate driver 121_1 (or 121_2), the second gate driver 122_1 (or 122_2), the third gate driver 123_1 (or 123_2), and the fourth gate driver 124_1 (or 124_2), please refer to FIG. 1 and FIG. 3A to FIG. 3D at the same time. FIG. 3A to FIG. 3D are schematic diagrams of the first gate driver to the fourth gate driver according to the embodiment of FIG. 1 of the disclosure.

Figure 3A:
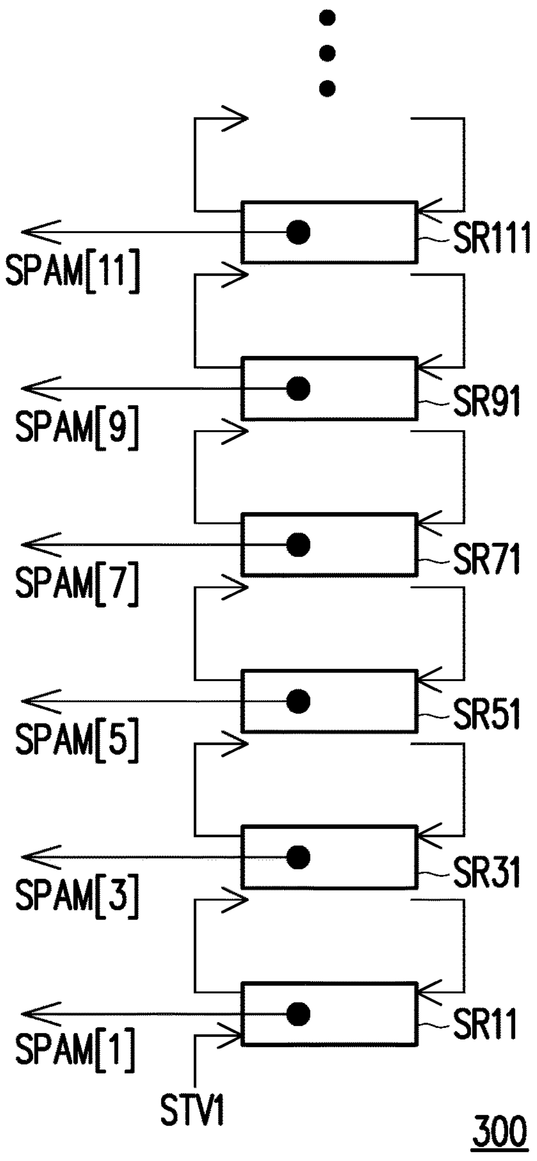
FIG. 3A to FIG. 3D are schematic diagrams of the first gate driver to the fourth gate driver according to the embodiment of FIG. 1 of the disclosure.

Here, please refer to FIG. 1 and FIG. 3A at the same time. The first gate driver 121_1 (or 121_2) of the embodiment may be implemented by a gate driver 300 shown in FIG. 3A.

In the embodiment, the gate driver 300 may include multiple shift register circuits (e.g., shift register circuits SR11, SR31, SR51, SR71, SR91, SR111, etc.). The shift register circuits SR11, SR31, SR51, SR71, SR91, and SR111 may be coupled in series with each other. The shift register circuit SR11 of the first stage of the gate driver 300 may receive a start pulse signal STV1. The shift register circuits SR11, SR31, SR51, SR71, SR91, and SR111 of the gate driver 300 may respectively generate multiple PAM control signals (e.g., the PAM control signals SPAM[1], SPAM[3], SPAM[5], SPAM[7], SPAM[9], SPAM[11], etc.) that are sequentially enabled (e.g., low voltage levels) according to the start pulse signal STV1.

Figure 3B:
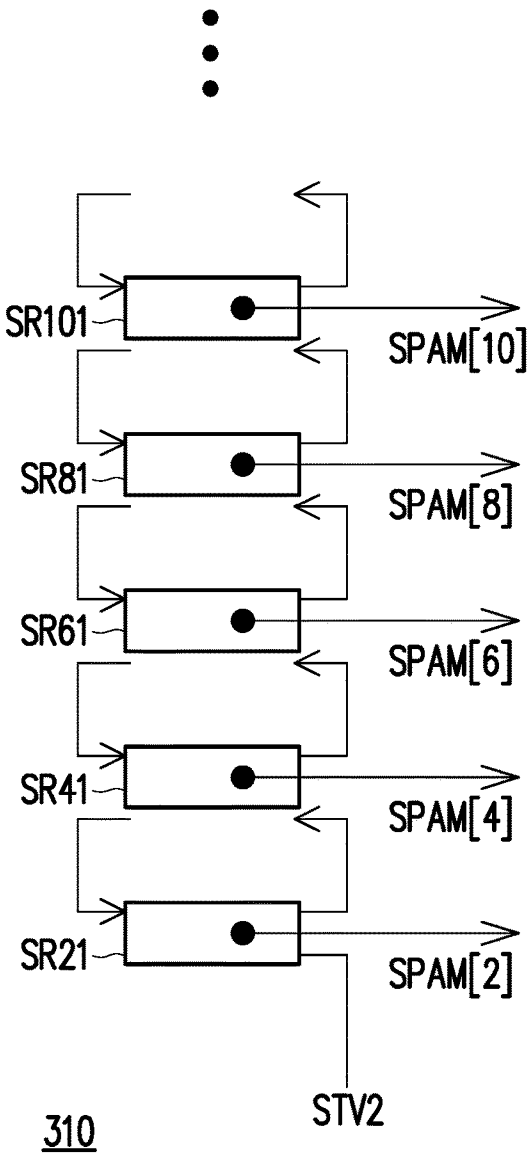

Here, please refer to FIG. 1 and FIG. 3B at the same time. The second gate driver 122_1 (or 122_2) of the embodiment may be implemented by a gate driver 310 shown in FIG. 3B.

In the embodiment, the gate driver 310 may include multiple shift register circuits (e.g., shift register circuits SR21, SR41, SR61, SR81, SR101, etc.). The shift register circuits SR21, SR41, SR61, SR81, and SR101 may be coupled in series with each other. The shift register circuit SR21 of the first stage of the gate driver 310 may receive a start pulse signal STV2. The shift register circuits SR21, SR41, SR61, SR81, and SR101 of the gate driver 310 may respectively generate multiple PAM control signals (e.g., the PAM control signals SPAM[2], SPAM[4], SPAM[6], SPAM[8], SPAM[10], etc.) that are sequentially enabled (e.g., low voltage levels) according to the start pulse signal STV2.

Figure 3C:
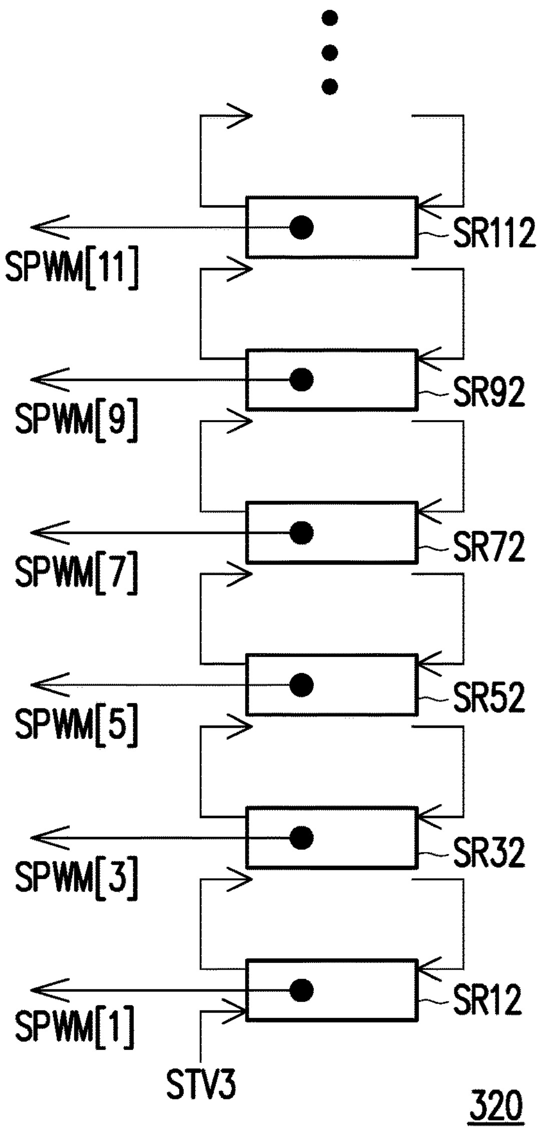

Here, please refer to FIG. 1 and FIG. 3C at the same time. The third gate driver 123_1 (or 123_2) of the embodiment may be implemented by a gate driver 320 shown in FIG. 3C.

In the embodiment, the gate driver 320 may include multiple shift register circuits (e.g., shift register circuits SR12, SR32, SR52, SR72, SR92, SR112 etc.). The shift register circuits SR12, SR32, SR52, SR72, SR92, and SR112 may be coupled in series with each other. The shift register circuit SR12 of the first stage of the gate driver 320 may receive a start pulse signal STV3. The shift register circuits SR12, SR32, SR52, SR72, SR92, and SR112 of the gate driver 320 may respectively generate multiple PWM control signals (e.g., the PWM control signals SPWM[1], SPWM[3], SPWM[5], SPWM[7], SPWM[9], SPWM[11], etc.) that are sequentially enabled (e.g., low voltage levels) according to the start pulse signal STV3.

Figure 3D:
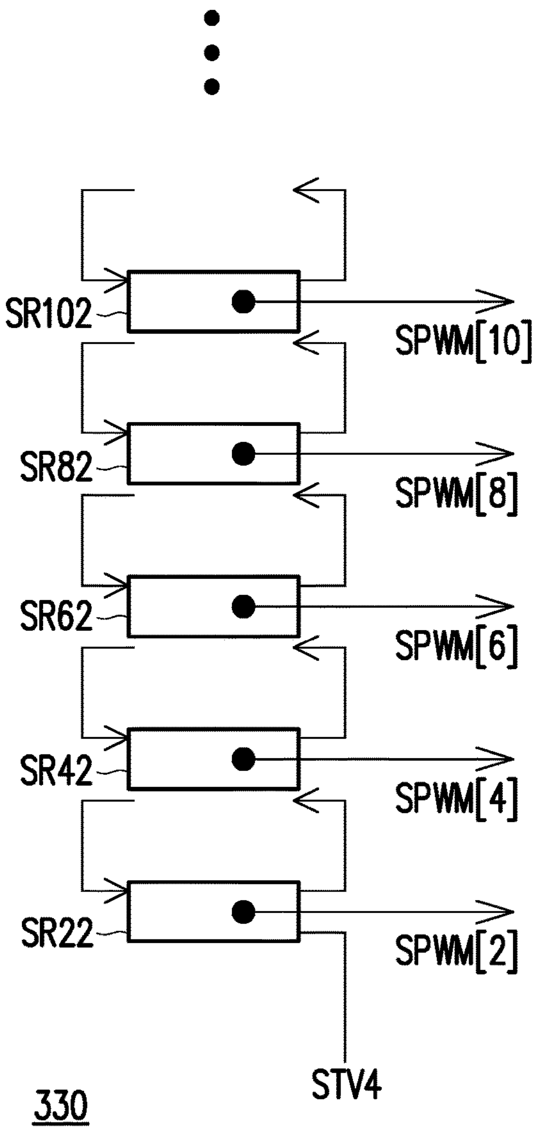

Here, please refer to FIG. 1 and FIG. 3D at the same time. The fourth gate driver 124_1 (or 124_2) of the embodiment may be implemented by a gate driver 330 shown in FIG. 3D.

In the embodiment, the gate driver 330 may include multiple shift register circuits (e.g., shift register circuits SR22, SR42, SR62, SR82, SR102, etc.). The shift register circuits SR22, SR42, SR62, SR82, and SR102 may be coupled in series with each other. The shift register circuit SR22 of the first stage of the gate driver 330 may receive a start pulse signal STV4. The shift register circuits SR22, SR42, SR62, SR82, and SR102 of the gate driver 330 may respectively generate multiple PWM control signals (e.g., the PWM control signals SPWM[2], SPWM[4], SPWM[6], SPWM[8], SPWM[10], etc.) that are sequentially enabled (e.g., low voltage levels) according to the start pulse signal STV4.

It should be noted that the embodiment does not limit the implementation of the gate drivers 300 to 330. For example, in some embodiments, each shift register circuit in the gate drivers 300 to 330 may include a shift register or a shift register circuit well known to those skilled in the art, and therefore relevant operations in each element will not be repeated here.

Please refer back to FIG. 1. In the embodiment, the light-emitting circuits 125_1 and 125_2 may be coupled to the multiple pixels in the first pixel rows PC1 and PC3 and the second pixel rows PC2 and PC4 of the display panel 110. The light-emitting circuits 125_1 and 125_2 may generate multiple light-emitting control signals EM[1] to EM[4] to the corresponding first pixel rows PC1 and PC3 and second pixel rows PC2 and PC4 to light up the corresponding pixels.

On the other hand, in the embodiment, the source driver 130 is coupled to the display panel 110. The source driver 130 may correspondingly generate the data voltages to the multiple first pixel rows and/or second pixel rows according to the driving methods of the first gate driver, the second gate driver, the third gate driver, and the fourth gate driver.

Figure 4:
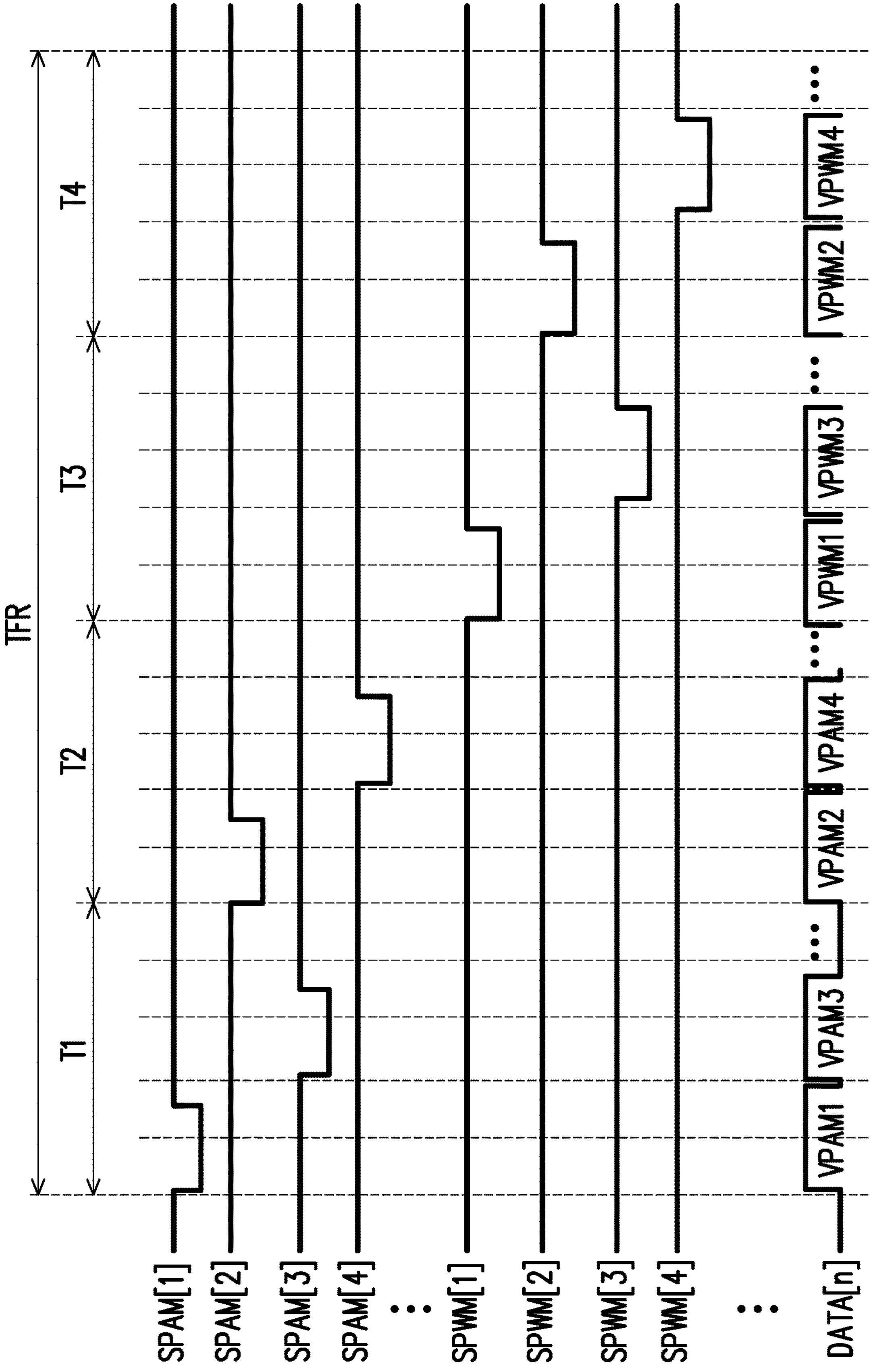
FIG. 4 is a timing diagram of the display device according to the embodiment of FIG. 1 of the disclosure.

FIG. 4 is a timing diagram of the display device according to the embodiment of FIG. 1 of the disclosure. Referring to FIG. 4, in the embodiment, a pixel period TFR of the display device 100 may be divided into a first time interval T1, a second time interval T2, a third time interval T3, and a fourth time interval T4. The display device 100 may operate sequentially in the first time interval T1, the second time interval T2, the third time interval T3, and the fourth time interval T4, and the first time interval T1, the second time interval T2, the third time interval T3, and the fourth time interval T4 do not overlap with each other.

For the implementation details of the display device 100, please refer to FIG. 1, FIG. 2, and FIG. 4 at the same time. Specifically, in the first time interval T1, the first gate drivers 121_1 and 121_2 may generate the PAM control signals SPAM[1] and SPAM[3] that are sequentially enabled (e.g., low voltage levels) to the PAM blocks of the multiple pixels of the odd-numbered rows of the display panel 110 (i.e., the multiple pixels P11 to PN1 in the first pixel row PC1 and the multiple pixels P13 to PN3 in the first pixel row PC3).

In this case, the first gate drivers 121_1 and 121_2 may sequentially drive the first pixel rows PC1 and PC3 (i.e., the pixel rows of the odd-numbered rows of the display panel 110) using the PAM driving method. Moreover, the source driver 130 may sequentially write the corresponding data voltages DATA[n] (e.g., PAM data voltages VPAM1 and VPAM3 under the first pixel rows PC1 and PC3 driven by the first gate drivers 121_1 and 121_2 using the PAM driving method) into the pixels of the first pixel rows PC1 and PC3.

Next, in the second time interval T2 following the first time interval T1, the second gate drivers 122_1 and 122_2 may generate the PAM control signals SPAM[2] and SPAM [4] that are sequentially enabled (e.g., low voltage levels) to the PAM blocks of the multiple pixels of the even-numbered rows of the display panel 110 (i.e., the multiple pixels P12 to PN2 in the second pixel row PC2 and the multiple pixels P14 to PN4 in the second pixel row PC4).

In this case, the second gate drivers 122_1 and 122_2 may sequentially drive the second pixel rows PC2 and PC4 (i.e., the pixel rows of the even-numbered rows of the display panel 110) using the PAM driving method. Moreover, the source driver 130 may sequentially write the corresponding data voltages DATA[n] (e.g., PAM data voltages VPAM2 and VPAM4 under the second pixel rows PC2 and PC4 driven by the second gate drivers 122_1 and 122_2 using the PAM driving method) into the pixels of the second pixel rows PC2 and PC4.

After the operation of the first gate drivers 121_1 and 121_2 and the second gate drivers 122_1 and 122_2 sequentially driving the first pixel rows PC1 and PC3 and the second pixel rows PC2 and PC4 using the PAM driving method has been completed, in the third time interval T3, the third gate drivers 123_1 and 123_2 may generate the PWM control signals SPWM[1] and SPWM[3] that are sequentially enabled (e.g., low voltage levels) to the PWM blocks of the multiple pixels of the odd-numbered rows of the display panel 110 (i.e., the multiple pixels P11 to PN1 in the first pixel row PC1 and the multiple pixels P13 to PN3 in the first pixel row PC3).

In this case, the third gate drivers 123_1 and 123_2 may sequentially drive the first pixel rows PC1 and PC3 (i.e., the pixel rows of the odd-numbered rows of the display panel 110) using the PWM driving method. Moreover, the source driver 130 may sequentially write the corresponding data voltages DATA[n] (e.g., PWM data voltages VPWM1 and VPWM3 under the first pixel rows PC1 and PC3 driven by the third gate drivers 123_1 and 123_2 using the PWM driving method) into the pixels of the first pixel rows PC1 and PC3.

Next, in the fourth time interval T4 following the third time interval T3, the fourth gate drivers 124_1 and 124_2 may generate the PWM control signals SPWM[2] and SPWM[4] that are sequentially enabled (e.g., low voltage levels) to the PWM blocks of the multiple pixels of the even-numbered rows of the display panel 110 (i.e., the multiple pixels P12 to PN2 in the second pixel row PC2 and the multiple pixels P14 to PN4 in the second pixel row PC4).

In this case, the fourth gate drivers 124_1 and 124_2 may sequentially drive the second pixel rows PC2 and PC4 (i.e., the pixel rows of the even-numbered rows of the display panel 110) using the PWM driving method. Moreover, the source driver 130 may sequentially write the corresponding data voltages DATA[n] (e.g., PWM data voltages VPWM2 and VPWM4 under the second pixel rows PC2 and PC4 driven by the fourth gate drivers 124_1 and 124_2 using the PWM driving method) into the pixels of the second pixel rows PC2 and PC4.

According to the above description, it may be known that under some design requirements (in some embodiments), the display device 100 may sequentially drive the multiple pixel rows of the odd-numbered rows (i.e., the first pixel rows) of the display panel 110 using the PAM driving method through the first gate drivers 121_1 and 121_2 . . . . Next, the display device 100 may sequentially drive the multiple pixel rows of the even-numbered rows (i.e., the second pixel rows) of the display panel 110 using the PAM driving method through the second gate drivers 122_1 and 122_2.

After the first and second gate drivers all complete the operation of driving the first pixel rows and the second pixel rows using the PAM driving method, the display device 100 may then sequentially drive the multiple pixel rows of the odd-numbered rows (i.e., the first pixel rows) of the display panel 110 using the PWM driving method through the third gate drivers 123_1 and 123_2.

Next, the display device 100 may sequentially drive the multiple pixel rows of the even-numbered rows (i.e., the second pixel rows) of the display panel 110 using the PWM driving method through the fourth gate drivers 124_1 and 124_2 to complete the data writing operations of the pixels P11 to PN1, P12 to PN2, P13 to PN3, and P14 to PN4. In this way, the display device 100 of the embodiment may effectively increase the charging time of the pixel circuit, whereby the charging efficiency of the pixel circuit may be improved so as to improve the display quality of the display screen.

Under other design requirements (in some other embodiments), when the display device 100 is operating in the first time interval T1, the display device 100 may also sequentially drive the multiple pixel rows of the odd-numbered rows (i.e., the first pixel rows) of the display panel 110 using the PWM driving method through the third gate drivers 123_1 and 123_2. Next, the display device 100 may sequentially drive the multiple pixel rows of the even-numbered rows (i.e., the second pixel rows) of the display panel 110 using the PWM driving method through the fourth gate drivers 124_1 and 124_2.

Moreover, after the third and fourth gate drivers all complete the operation of driving the first pixel rows and the second pixel rows using the PWM driving method, the display device 100 may then sequentially drive the multiple pixel rows of the odd-numbered rows (i.e., the first pixel rows) of the display panel 110 using the PAM driving method through the first gate drivers 121_1 and 121_2.

Next, the display device 100 may sequentially drive the multiple pixel rows of the even-numbered rows (i.e., the second pixel rows) of the display panel 110 using the PAM driving method through the second gate drivers 122_1 and 122_2 to complete the data writing operations of the pixels P11 to PN1, P12 to PN2, P13 to PN3, and P14 to PN4.

Figure 5A:
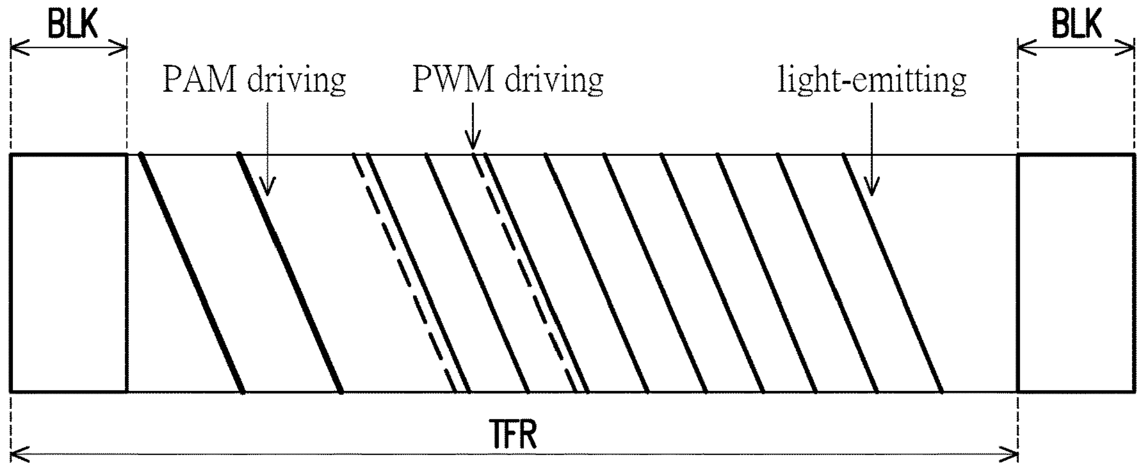
FIG. 5A to FIG. 5C are schematic diagrams of three operating scenarios of the display device according to the embodiment of FIG. 1 of the disclosure.
Figure 5B:
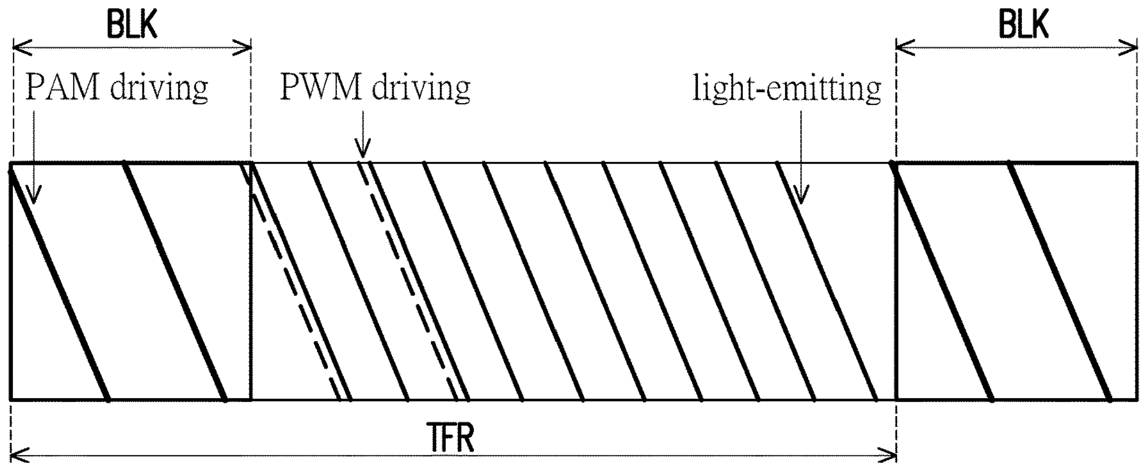
Figure 5C:
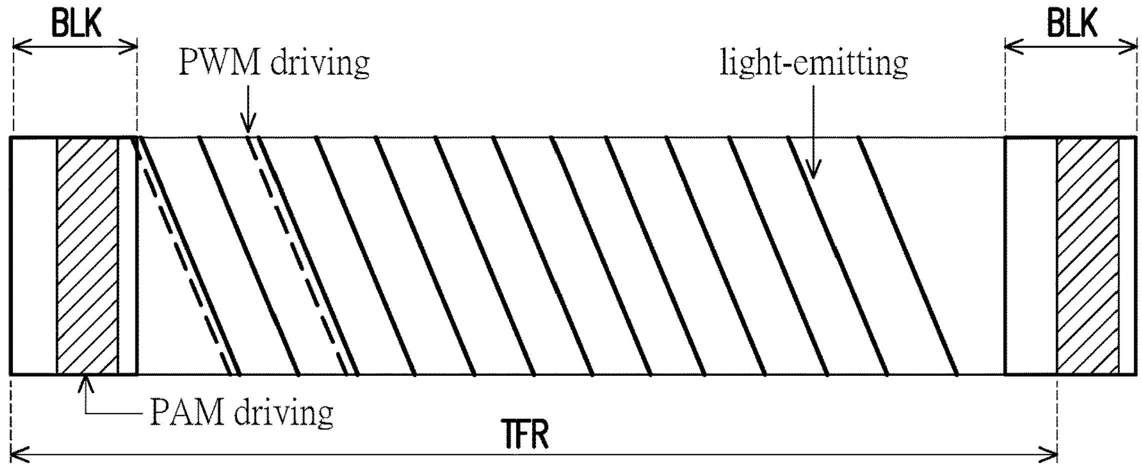

FIG. 5A to FIG. 5C are schematic diagrams of three operating scenarios of the display device according to the embodiment of FIG. 1 of the disclosure. In continuation of the description of the embodiment of FIG. 4, please refer to FIG. 1, FIG. 4, and FIG. 5A to FIG. 5C at the same time. In the embodiment, the pixel period TFR of the display device 100 may further include a vertical blanking time interval BLK.

Specifically, in the embodiment of FIG. 5A, after the vertical blanking time interval BLK, the display device 100 may start to sequentially drive the multiple pixel rows of the odd-numbered rows (i.e., first pixel rows) and the multiple pixel rows of the even-numbered rows (i.e., second pixel rows) of the display panel 110 using the PAM driving method through the first gate drivers 121_1 and 121_2 and the second gate drivers 122_1 and 122_2.

That is to say, in the embodiment of FIG. 5A (same or similar to the embodiment of FIG. 4), the first gate drivers 121_1 and 121_2 and the second gate drivers 122_1 and 122_2 may stop executing the PAM driving method on the pixel rows in the vertical blanking time interval BLK.

On the other hand, in the embodiment of FIG. 5B, when the display device 100 is operating in the vertical blanking time interval BLK, the display device 100 may start to sequentially drive the multiple pixel rows of the odd-numbered rows (i.e., first pixel rows) and the multiple pixel rows of the even-numbered rows (i.e., second pixel rows) of the display panel 110 using the PAM driving method through the first gate drivers 121_1 and 121_2 and the second gate drivers 122_1 and 122_2.

That is to say, in the embodiment of FIG. 5B, the first gate drivers 121_1 and 121_2 and the second gate drivers 122_1 and 122_2 may keep executing the PAM driving method on the pixel rows in the vertical blanking time interval BLK.

On the other hand, in the embodiment of FIG. 5C, when the display device 100 is operating in the vertical blanking time interval BLK, the multiple shift register circuits in the first gate drivers 121_1 and 121_2 and the second gate drivers 122_1 and 122_2 may generate simultaneously enabled PAM control signals to provide fixed constant PAM control signals to the corresponding pixel rows.

After the display device 100 completes the operation of the vertical blanking time interval BLK, the display device 100 may then sequentially drive the multiple pixel rows of the odd-numbered rows (i.e., first pixel rows) and the multiple pixel rows of the even-numbered rows (i.e., second pixel rows) of the display panel 110 using the PWM driving method through the third gate drivers 123_1 and 123_2 and the fourth gate drivers 124_1 and 124_2.

Figure 6:
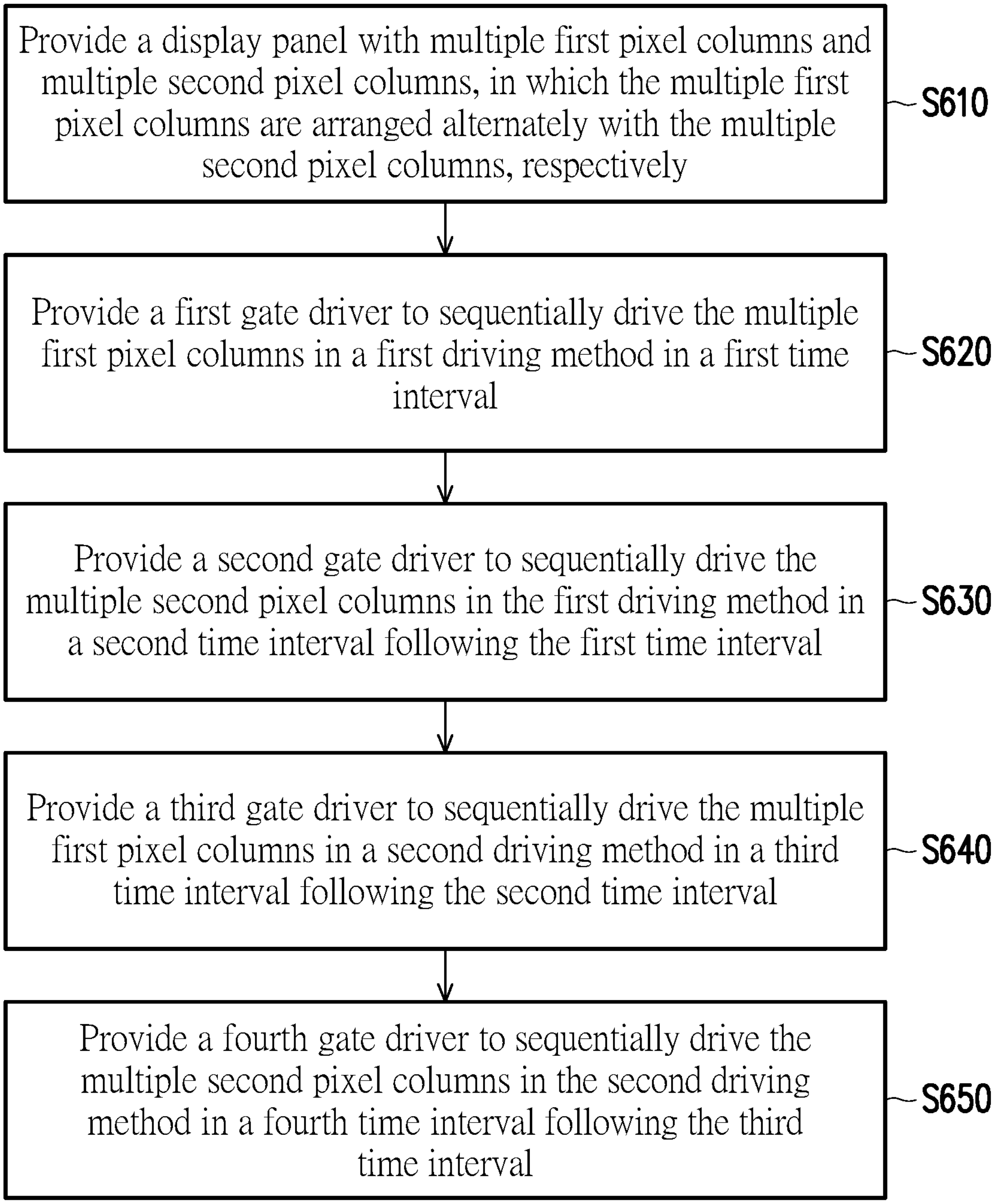
FIG. 6 is a flowchart of a driving method of a display device according to an embodiment of the disclosure.

FIG. 6 is a flowchart of a driving method of a display device according to an embodiment of the disclosure. Please refer to FIG. 1 and FIG. 6 at the same time. In step S610, the display device provides the display panel with the multiple first pixel rows and the multiple second pixel rows. The multiple first pixel rows are arranged alternately with the multiple second pixel rows, respectively. In step S620, in the first time interval, the display device provides the first gate driver to sequentially drive the multiple first pixel rows using the first driving method.

In step S630, in the second time interval following the first time interval, the display device provides the second gate driver to sequentially drive the multiple second pixel rows using the first driving method. In step S640, in the third time interval following the second time interval, the display device provides the third gate driver to sequentially drive the multiple first pixel rows using the second driving method. In step S650, in the fourth time interval following the third time interval, the display device provides the fourth gate driver to sequentially drive the multiple second pixel rows using the second driving method.

The implementation details of each step have been described in details in the aforementioned embodiments and implementation modes and therefore will not be repeated below.

In summary, the display device and the driving method thereof of the disclosure may sequentially drive the pixels in the first and second pixel rows using the first driving method through the first and second gate drivers in the first and second time intervals. Moreover, the display device may sequentially drive the pixels in the first and second pixel rows using the second driving method through the third and fourth gate drivers in the third and fourth time intervals. In this way, the display device of the disclosure may effectively increase the charging time of the pixel circuit, whereby the charging efficiency of the pixel circuit may be improved so as to improve the display quality of the display screen.

What is claimed is:

1. A display device, comprising:

a display panel, having a plurality of first pixel rows and a plurality of second pixel rows, wherein the first pixel rows are arranged alternately with the second pixel rows, respectively;

a first gate driver, sequentially driving the first pixel rows using a first driving method according to a plurality of first control signals that are sequentially enabled in a first time interval;

a second gate driver, sequentially driving the second pixel rows using the first driving method according to a plurality of second control signals that are sequentially enabled in a second time interval following the first time interval;

a third gate driver, sequentially driving the first pixel rows using a second driving method according to a plurality of third control signals that are sequentially enabled in a third time interval following the second time interval; and a fourth gate driver, sequentially driving the second pixel rows using the second driving method according to a plurality of fourth control signals that are sequentially enabled in a fourth time interval following the third time interval, wherein one of the first driving method and the second driving method is a pulse amplitude modulation (PAM) driving method, and the other of the first driving method and the second driving method is a pulse-width modulation (PWM) driving method, wherein in a pixel period of the display device, enabling states of the plurality of third control signals and the plurality of fourth control signals occur after enabling states of the plurality of first control signals and the plurality of second control signals.

2. The display device according to claim 1, wherein the first gate driver and the second gate driver keep executing the first driving method in a vertical blanking time interval, and the display panel without display an image during the vertical blanking interval.

3. The display device according to claim 1, wherein the first gate driver and the second gate driver stop executing the first driving method in a vertical blanking time interval.

4. The display device according to claim 1, wherein the display device further comprises:

a source driver, coupled to the display panel, and configured to provide a plurality of data voltages to a plurality of pixels in the first pixel rows or a plurality of pixels in the second pixel rows according to a type of the first driving method or the second driving method.

5. The display device according to claim 1, wherein the first pixel rows are pixel rows of odd-numbered rows of the display panel and the second pixel rows are pixel rows of even-numbered rows of the display panel.

6. A driving method of a display device, comprising:

providing a display panel with a plurality of first pixel rows and a plurality of second pixel rows, wherein the first pixel rows are arranged alternately with the second pixel rows, respectively;

providing a first gate driver to sequentially drive the first pixel rows using a first driving method according to a plurality of first control signals that are sequentially enabled in a first time interval;

providing a second gate driver to sequentially drive the second pixel rows using the first driving method according to a plurality of second control signals that are sequentially enabled in a second time interval following the first time interval;

providing a third gate driver to sequentially drive the first pixel rows using a second driving method according to a plurality of third control signals that are sequentially enabled in a third time interval following the second time interval; and providing a fourth gate driver to sequentially drive the second pixel rows using the second driving method according to a plurality of fourth control signals that are sequentially enabled in a fourth time interval following the third time interval, wherein one of the first driving method and the second driving method is a pulse amplitude modulation (PAM) driving method, and the other of the first driving method and the second driving method is a pulse-width modulation (PWM) driving method, wherein in a pixel period of the display device, enabling states of the plurality of third control signals and the plurality of fourth control signals occur after enabling states of the plurality of first control signals and the plurality of second control signals.

7. The driving method according to claim 6, further comprising:

enabling the first gate driver and the second gate driver to keep executing the first driving method in a vertical blanking time interval, and the display panel without display an image during the vertical blanking interval.

8. The driving method according to claim 6, further comprising:

enabling the first gate driver and the second gate driver to stop executing the first driving method in a vertical blanking time interval.

9. The driving method according to claim 6, further comprising:

providing a source driver to provide a plurality of data voltages to a plurality of pixels in the first pixel rows or a plurality of pixels in the second pixel rows according to a type of the first driving method or the second driving method.

10. The driving method according to claim 6, wherein the first pixel rows are pixel rows of odd-numbered rows of the display panel and the second pixel rows are pixel rows of even-numbered rows of the display panel.

* * * * *